United States Patent [19]

Waters et al.

[11] Patent Number: 4,573,893

[45] Date of Patent: Mar. 4, 1986

[54] EXTRUSION DIE WITH EXTERNAL AND INTERNAL COOLING MEANS

[75] Inventors: Michael A. Waters, Elk Grove Village; Daniel P. Boll, Mt. Prospect, both of Ill.

[73] Assignee: Application Engineering Corporation, Wood Dale, Ill.

[21] Appl. No.: 596,032

[22] Filed: Apr. 2, 1984

[51] Int. Cl.$^4$ .......................... B29D 7/02; B29F 3/08
[52] U.S. Cl. .................. 425/71; 425/378 R; 425/461
[58] Field of Search ............... 425/72 R, 73, 37 R, 425/190, 71, 378 R, 461, 143

[56] References Cited

U.S. PATENT DOCUMENTS

| | | | |
|---|---|---|---|
| 705,756 | 7/1902 | Hayes | 425/190 |
| T915,014 | 10/1973 | Goldman | 425/72 R |
| 2,734,224 | 2/1956 | Winstead | 425/190 |
| 2,774,991 | 12/1956 | McCurdy et al. | 425/72 R |
| 2,814,071 | 11/1957 | Allan et al. | 264/180 |
| 3,307,218 | 3/1967 | Reifenhäuser | 425/71 |
| 3,315,308 | 4/1967 | Wiley et al. | 425/71 |
| 3,522,337 | 7/1970 | Ball | 264/95 |
| 3,742,105 | 6/1973 | Kuroda | 264/209.1 |
| 3,871,807 | 3/1975 | Meyniel et al. | 425/71 |
| 3,907,960 | 9/1975 | Carrow | 264/314 |
| 3,907,961 | 9/1975 | Carrow | 425/71 |
| 3,990,828 | 11/1976 | Reifenhäuser | 425/326 R |
| 4,130,616 | 12/1978 | Clifford | 425/71 |
| 4,419,309 | 12/1983 | Krutchen | 425/72 R |

FOREIGN PATENT DOCUMENTS 1284321 8/1972 United Kingdom ............ 425/72 R

*Primary Examiner*—Willard E. Hoag
*Attorney, Agent, or Firm*—Kinzer, Plyer, Dorn & McEachran

[57] ABSTRACT

This invention relates to apparatus for controlled cooling of an extruded plastic product. As the product exits the extrusion die, it passes through an elongated shell. The shell surrounds the die at its inner end and extends outwardly along the extrusion. A seal ring at the outer end of the shell engages the exterior of the extruded product; the shell, seal ring, and product define an annular cooling chamber through which a coolant is circulated through the cooling chamber, the coolant exiting through an annular cooling chamber extension in the die. For a hollow extruded product, the apparatus further includes an internal cooling tube that extends axially through the interior of the hollow product. The tube ends at a seal cap that engages the internal surface of the hollow product. The tube and seal cap define a second, internal cooling chamber through which coolant circulates; the coolant enters throught the end of the tube opposite the seal cap and exits through an annular recess in the die.

18 Claims, 5 Drawing Figures

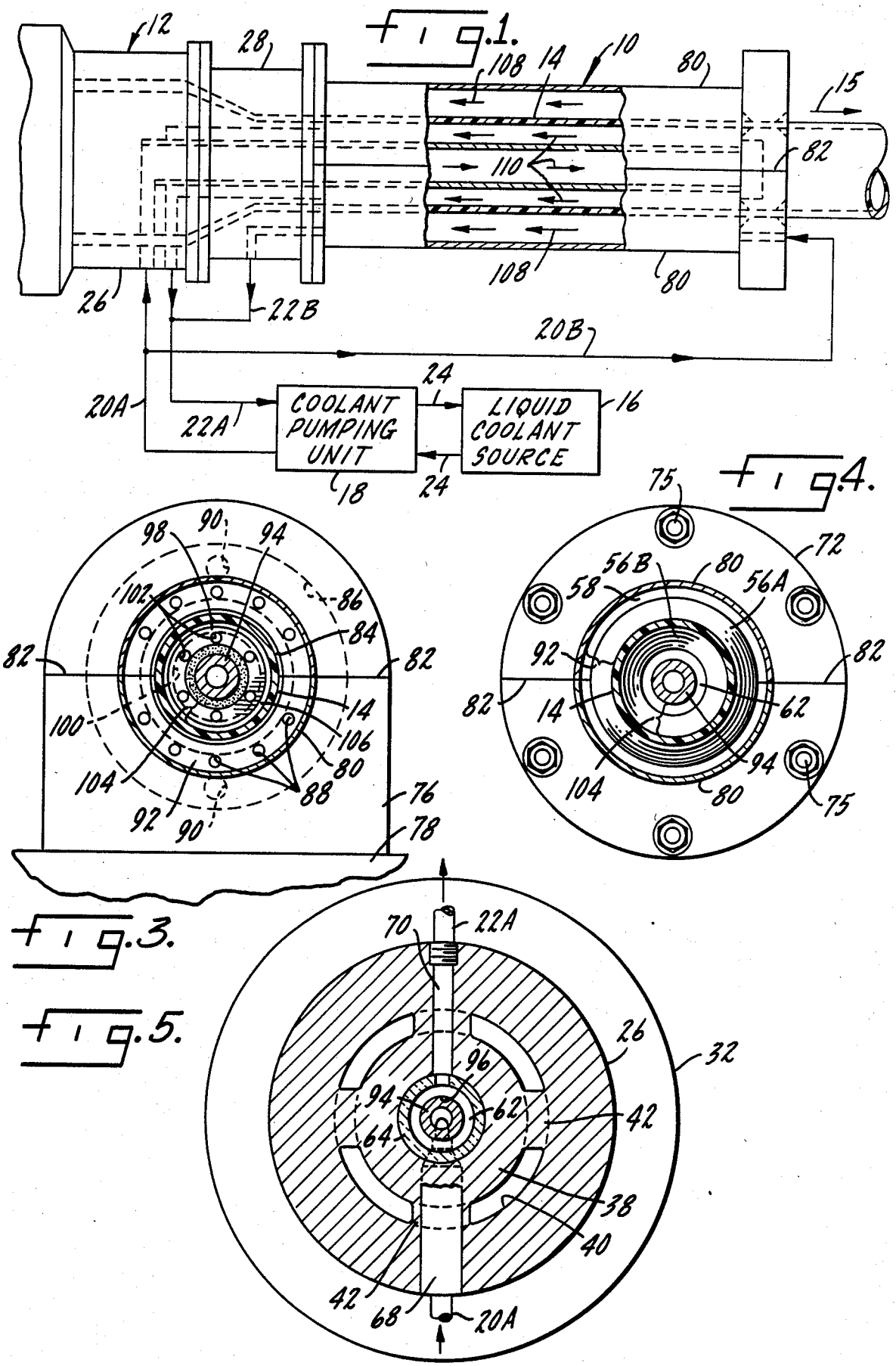

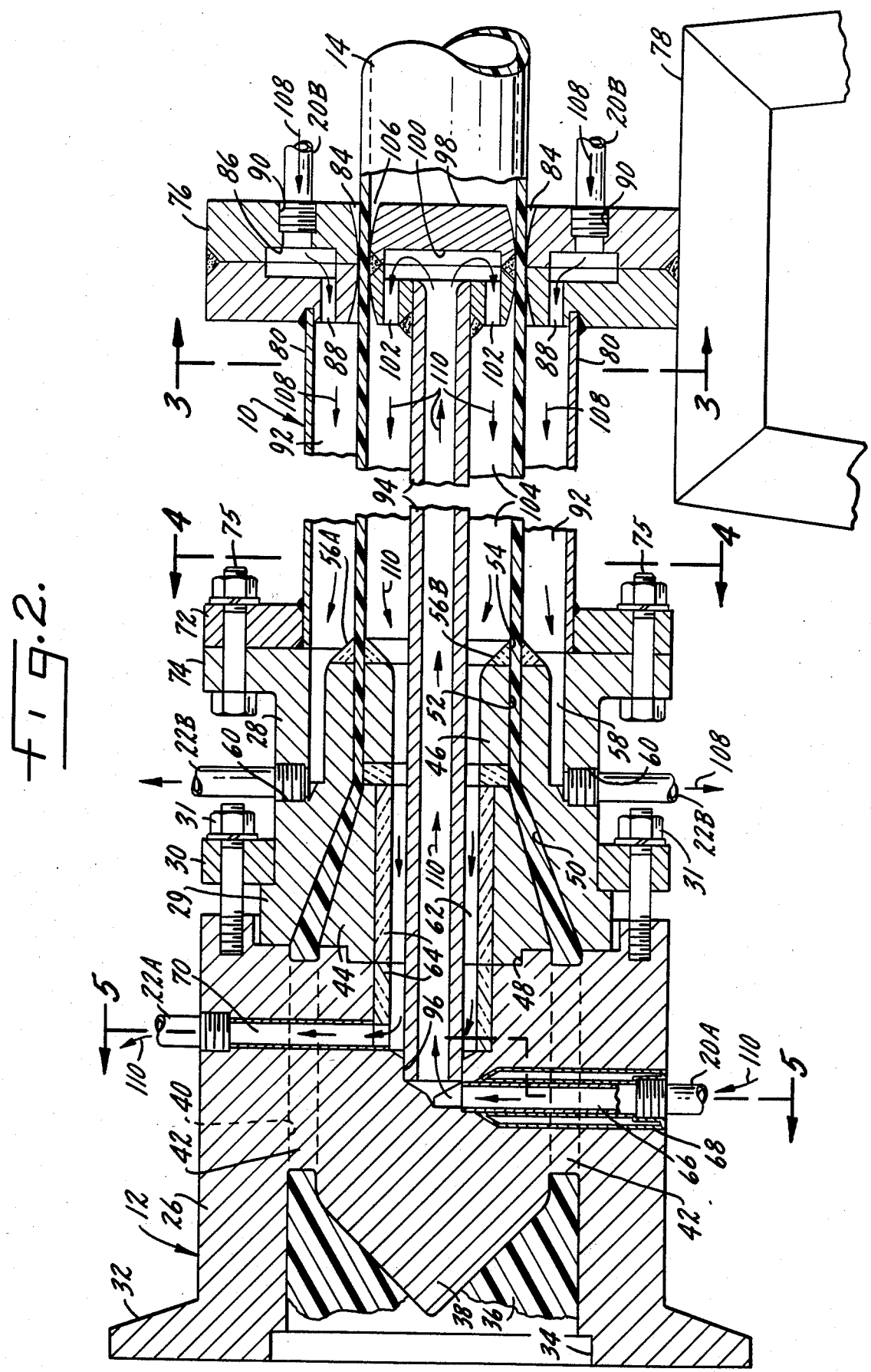

EXTRUSION DIE WITH EXTERNAL AND INTERNAL COOLING MEANS

BACKGROUND OF THE INVENTION

A continuous extruder of a plastic product, whether formed of a thermoplastic resin or a thermosetting resin, produces a product that is very hot and soft and has little strength. The product is still quite plastic and must be cooled to achieve structural integrity. The longer the product remains soft, the greater the likelihood of surface damage or even structural damage. Thus, prompt and effective cooling of the extruded product is of substantial importance.

A variety of different cooling arrangements have been employed for continuous plastic extruders. For example, Allan et al. U.S. Pat. No. 2,814,071 discloses a variety of forms of external cooling for a tubular extrusion as it emerges from an extruding die. Thus, this patent refers to external air blast cooling, water spray cooling, or open trough water bath cooling; the patent specifically states that air cooling is preferred. This patent shows an internal air circulation technique used primarily for support of the tube; any cooling effect appears to be only incidental.

Ball U.S. Pat. No. 3,522,377 discloses a rather complex apparatus for internal cooling of an extruded tube with cooling water introduced at a downstream point in the tube by means of a coaxial internal cooling line. A gas stream is used, upstream, to deflect the cooling liquid into a drainage system. No specific external cooling arrangement is disclosed. Carrow U.S. Pat. No. 3,907,961 described another internal cooling arrangement for an extruded tube, using a support cylinder with a spiral external groove to circulate a cooling fluid in contact with the internal surface of the tube. Reifenhauser U.S. Pat. No. 3,990,828 describes another internal cooling apparatus that uses water as the coolant; the cooling apparatus features a plurality of axially spaced baffle discs.

None of these prior art cooling devices provides for effective external cooling of an extruded plastic product by means of a liquid coolant (i.e., water), despite the fact that a liquid coolant is inherently more effective than a gas (i.e., air) cooling. The usual air cooling arrangement is inefficient and required an excessively long cooling zone. A water trough cannot cool the upper part of the extrusion, particularly a hollow extrusion. Problems of surface damage and even structural damage remain prevalent, even with the best of systems.

SUMMARY OF THE INVENTION

A primary object of the invention, therefore, is to increase productivity of an extruder through enhanced cooling, using a liquid coolant contacting the entire exterior of an extrusion.

Another object of the invention is to improve the quality of products made by an extruder by rapidly an uniformly cooling the product as it emerges from the extruder, employing a liquid coolant throughout.

Another object of the invention is to improve the dimensional integrity across the product surfaces as a result of uniform, controlled cooling, employing a liquid coolant throughout.

A further object of the invention is to reduce the overall length required for cooling beyond the extrusion die.

Accordingly, the invention is directed to a cooling apparatus for an extruder of the kind in which hot molten resin is forced through an extruding die to form an elongted extrusion of given cross-sectional shape, employing a liquid coolant. The apparatus comprises a cylindrical shell having its inner end surrounding the outlet of the extruding die and projecting outwardly therefrom in encompassing relation to a predetermined length of the extrusion emerging from the die. A shell seal ring extends radially inwardly of the outer end of the shell and has an axial outlet opening with a shape conforming to the external cross-sectional shape of the extrusion. The shell, the seal ring, and the external surface of the extrusion afford an annular, sealed cooling chamber encompassing a predetermined length of the extrusion emerging from the die. An annular cooling chamber extension is formed in the extruding die in fluid communication with the cooling chamber so as to effectively extend the cooling chamber into the die. At least one inlet port is connected to the outer end of the cooling chamber and at least one outlet port is connected to the cooling chamber extension. Means are provided, connected to the inlet and outlet ports, for filling the cooling chamber with a liquid coolant and for circulating the liquid coolant through the cooling chamber from its outer end to its inner end and out through the chamber extension to cool the external surface of the extrusion and solidify the extrusion as it emerges from the extruder.

As applied to extrusion products having a hollow cross-sectional shape, the cooling apparatus of the invention further includes a tube extending axially through the outer portion of the die and through at least a portion of the shell. The tube has a maximum transverse dimension which is substantially smaller than the minimum internal dimension of the extrusion. A seal cap is mounted on the outer end of the tube and has an external shape matching the internal shape of the extrusion. An annular opening in the die encompasses the inner end of the tube. The tube, the seal cap, the inner surface of the extrusion and the annular sealed opening in the die define a second annular cooling chamber within the interior of a length of the extrusion emerging from the die. A passageway connects the interior of the tube, at its outer end, to the second cooling chamber. Inlet and outlet ports are connected to the tube interior and to the die recess, respectively. Means are provided for circulating a liquid coolant through each of the cooling chambers, from the outer ends to the inner ends, to cool and solidify the extrusion as it emerges from the extruder.

BRIEF DESCRIPTION OF THE DRAWINGS

FIG. 1 is a schematic representation of a cooling system constructed in accordance with the invention, including an extrusion die, the cooling apparatus and the coolant circulating paths.

FIG. 2 is an enlarged sectional elevation view of an extrusion die and a cooling apparatus constructed in accordance with the invention.

FIG. 3 is a section view taken approximately along line 3—3 of FIG. 2.

FIG. 4 is a section view taken approximately along line 4—4 of FIG. 2.

FIG. 5 is a section view taken approximately along line 5—5 of FIG. 2.

DESCRIPTION OF A PREFERRED EMBODIMENT

FIG. 1 is a schematic representation of a cooling system for an extruder of the kind in which hot molten resin is forced through an extruding die to form an elongated extrusion of given cross-sectional shape. The system includes a cooling apparatus 10 which is attached to a die block 12. The die block 12 produces an elongated extrusion 14 which is encompassed by the cooling apparatus 10 as the extrusion emerges from the die block. The extrusion moves in the direction of arrow 15.

The system includes a liquid coolant source indicated diagrammatically at 16. The coolant most commonly used is water, which may be derived from a municipal water supply, a water cooling tower or other suitable source. Provision for control of the temperature of the water or other coolant may be included in source 16 in accordance with conventional practice. A coolant pumping unit 18 circulates the coolant between the source 14, the cooling apparatus 10 and the die block 12. The pumping unit is preferably a positive displacement pump which draws cooling water through the cooling apparatus and die block under negative pressure. This prevents coolant leakage that might occur in a conventional pressure system. Negative pressure units suitable for this application are sold by Application Engineering Corporation of Wood Dale, Ill. under the trademark VACUFLOW.

The coolant pumping unit 18 circulates liquid coolant to the cooling apparatus 10 and the die block 12 through coolant supply lines 20A and 20B. The coolant is fed into the apparatus such that it flows countercurrent to the extrusion 14. Details of the flow paths will be discussed below. Coolant exiting the die block 12 returns to the pumping unit 18 through return lines 22 and 22B. Also, fluid communication between the pumping unit 18 and coolant source 16 is provided by lines 24.

Turning now to FIG. 2, the cooling apparatus 10 and die block 12 are shown in detail. The die block 12 includes two main sections, a die body 26 and an orifice body 28. These sections of the die block are held together by a retaining ring 30 which engages a flange 29 on the orifice body 28 and is bolted to the face of the die body 26 by a series of bolts 31. The left end of the die body has a flange 32 which can be used for mounting the die block 12 to the apparatus supplying molten resin, under pressure, to the die.

Looking at the interior of the die block 12, there is an annular resin receiving chamber 34 in die body 26. The resin itself is shown at 36. A mandrel 38 that is part of the die body 26 is disposed in the receiving chamber of the die body 26. The mandrel and the peripheral portion of the die body define an annular channel 40 about the mandrel's periphery through which the resin flows. The channel 40 is best seen in FIG. 5. FIG. 5 also illustrates a series of spider members 42 which support the mandrel 38 in the center of the die body 26. These spider members also support the internal portions of the orifice body 28, including an internal conical segment 44 and an internal orifice segment 46. The conical segment 44 is centered by the mating shoulder and recess illustrated at 48. Together, the internal conical segment 44 and the peripheral portion of the orifice body 28 define an annular resin passageway 50 which is in communication with the channel 40. The passageway 50 leads a final extrusion passage 52 which is defined by the internal orifice segment 46 and the orifice body 28. In the passageway 52 the resin attains the final cross-sectional shape of the extrusion. The extrusion exits from the die block at the orifice 54. The orifice preferably has ceramic insulating tips 56A and 56B.

The die block 12 has several passages which cooperate with the cooling apparatus 10 to permit inlet and outlet of the liquid coolant at suitable locations relative to the extrusion. Among these passages is an annular cooling chamber extension 58 formed in the orifice body 28. Outlet ports 60 connect the cooling chamber extension 58 to return lines 22B. Another coolant passage in the die block is an annular opening 62 that extends through the interior orifice segment 46, the interior conical segment 44, and into the mandrel 38. A substantial length of the surface of the annular opening 62 is lined by a cylindrical insulation bushing 64, preferably a ceramic insulator. The insulation bushing 64 provides a thermal barrier between the coolant flowing in the annular opening 62 and the molten resin flowing through the passageway 50 to preclude excessive premature cooling of the resin in that passageway. Coolant from the annular opening 62 exits through an outlet opening 70. The die body 26 also contains an opening 66 which supplies coolant to a tube that is described below. The opening 66 is preferably lined with an evacuated insulator tube 68.

Turning now to the details of the cooling apparatus 10, the apparatus is supported at its left end by a flat face flange 72 which is bolted to a mating flange 74 on the orifice body 28 by a series of bolts 75. The right end of the cooling apparatus is supported by a shell seal ring 76 which may be mounted on a frame 78.

The cooling apparatus 10 includes a cylindrical shell 80 that is welded to the flange 72 and the shell seal ring 76. The flange 72, seal ring 76 and shell 80 are split into upper and lower halves joined along a plane generally parallel to the shell axis. The joint is indicated at 82 in FIGS. 1, 3, and 4. The purpose of the split shell is to permit access to the die orifice and the extrusion upon start up of the extruder.

The shell seal ring 76 extends radially inwardly of the outer end of the shell 80 (see FIGS. 2 and 3) and has an axial outlet opening 84. The innermost part of the opening 84 conforms to the external cross-sectional shape of the extrusion 14. Preferably, the outlet opening has a convex configuration as shown in FIG. 2. This shape minimizes contact with the surface of the extrusion so that the risk of marring the surface is reduced. The shell seal ring 76 further includes an interior, annular channel 86 which is in fluid communication with the interior of the shell 80 through a plurality of ports 88. The channel 86 is supplied with coolant through a pair of inlets 90. It will be noted in FIGS. 2 and 3 that the inlets 90 are offset from the ports 88. This allows greater separation of the ports 90 from the extrusion 14, thereby reducing interference between coolant supply lines 20B and the extrusion 14. The shell 80 and seal ring 76 define a first or outer annular cooling chamber 92 (see FIGS. 2 and 4). The outer cooling chamber encompasses the exterior of a length of the extrusion 14 emerging from the die 12.

The cooling apparatus 10 further includes a tube 94 extending axially from a socket 96 in the mandrel 38 to a seal cap 98 near the shell seal 76. The tube has a maximum outer diameter which is substantially smaller than the internal dimension of the extrusion. Thus, the tube 94 extends through the annular opening 62 in the die block and through the interior of the extrusion. The interior of the tube 94 communicates with a chamber 100 in the seal cap 98. Ports 102 in the seal cap connect the chamber 100 to the exterior of the tube 94. This space between the outside of the tube 94 and the interior dimension of the extrusion 14 defines a second or inner cooling chamber 104 (FIGS. 2 and 4). The exterior surface 106 of the seal cap 98 has a convex shape, similar to that of the axial outlet opening 84.

During start up of the extruder served by the cooling apparatus 10 the upper half of the shell 80 is removed to provide access to the orifice 54 as the extrusion process begins. The extrusion 14 is guided over the seal cap 98. Once that is done the top half of the shell 80 is installed and the pumping unit 18 is turned on. Liquid coolant is then circulated past the extrusion 14 to cool and solidify the extrusion as it emerges from the extruder die at the orifice 54. The coolant is circulated through two separate paths. The first path is shown by arrows 108, the second by arrows 110. In the first path coolant is supplied to the ports 90 of the seal ring 76. From there it flows to the channel 86 and through ports 88 into the first or outer cooling chamber 92. The cooling chamber 92 is in communication with the chamber extension 58 and from there the coolant returns to the pumping unit through outlets 60 and lines 22B.

The other flow path is through the inlet 66 to the interior of tube 94. The coolant flows the full length of the tube 94 and enters the pocket 100 of the seal cap 98. The coolant enters the inner or second annular cooling chamber 104 through ports 102 in the seal cap. The coolant flows through chamber 104 to the annular opening 62 in the die and exits through the die outlet 70.

Although the cooling apparatus has been shown and described with dual flow paths for cooling interior and exterior surfaces of a hollow extrusion such as pipe 14, it will be understood that in some applications the inner cooling chamber may not be employed, as in the case of a solid extrusion. In that case the outer cooling chamber alone is used to effect the desired cooling.

The cooling apparatus 10 takes advantage of the high thermal capacity of a liquid coolant such as water, allowing for rapid cooling to achieve structural integrity for the extrusion in a minimum length after emergence from the die orifice. The possibility of surface damage or structural damage to the extrusion is thus minimized; improved control over suface quality and consistency of extrusion shape is realized. The entire exterior surface of the extrusion is contacted by the liquid coolant in a flow that minimizes the possibility of surface damage from the coolant itself.

The split construction for the tube 80 and the seal ring 76 greatly facilitates start up of the cooling apparatus 10; the preferred negative pressure coolant pumping system minimizes leakage problems. With a liquid coolant used throughout, precise control of the cooling of the extrusion is greatly facilitated, as compared with air cooling, through close control of the coolant temperature and pumping rate.

We claim:

1. Cooling apparatus for an extruder of the kind in which hot molten resin is forced through an extruding die to form an elongated extrusion of given cross-sectional shape, employing a liquid coolant, comprising:

a cylindrical shell having its inner end surrounding the outlet of the extruding die and projecting outwardly therefrom in encompassing relation to a predetermined length of the extrusion emerging from the die;

a shell seal ring extending radially inwardly of the outer end of the shell and having an axial outlet opening with a shape conforming to the external cross-sectional shape of the extrusion;

the shell, the seal ring, and the external surface of the extrusion affording an annular, sealed cooling chamber encompassing a predetermined length of the extrusion emerging from the die;

an annular cooling chamber extension formed in the extruding die, in fluid communication with the cooling chamber so as to effectively extend the cooling chamber into the die;

at least one inlet port connected to the outer end of the cooling chamber;

at least one outlet port connected to the cooling chamber extension;

and means, connected to the inlet and outlet ports, for filling the cooling chamber with a liquid coolant and for circulating the liquid coolant through the cooling chamber from its outer end to its inner end and out through the chamber extension to cool the external surface of the extrusion and solidify the extrusion as it emerges from the extruder 2. The cooling apparatus of claim 1 wherein the cylindrical shell comprises two pieces joined along a plane generally parallel to the shell axis.

3. The cooling apparatus of claim 1 wherein the shell seal ring is split through the axial outlet opening into two portions such that upon start up of the apparatus the shell seal ring can be assembled about the elongated extrusion with the extrusion extending through the axial outlet opening.

4. The cooling apparatus of claim 1 wherein the axial outlet opening of the shell seal ring has a convex surface.

5. The cooling apparatus of claim 1 wherein the means for circulating a liquid coolant comprises means for maintaining a pressure in the cooling chamber which is below atmospheric pressure so that coolant does not leak out of the axial outlet opening of the shell seal ring.

6. Cooling apparatus for an extruder of the kind in which hot molten resin is forced through a generally annular orifice in an extruding die to form an elongated hollow extrusion of given cross-sectional shape, employing a liquid coolant, comprising:

a cylindrical shell having its inner end surrounding the outlet of the die orifice and projecting outwardly therefrom in encompassing relation to a predetermined length of the extrusion emerging from the die;

a shell seal ring extending radially inwardly of the outer end of the shell and having an axial outlet opening with a shape conforming to the external cross-sectional shape of the extrusion;

the shell, the seal ring, and the external surface of the extrusion affording a first annular, sealed cooling chamber encompassing the exterior of a predetermined length of the extrusion emerging from the die;

at least one inlet port connected to the outer end of the first cooling chamber;

at least one outlet port connected to the inner end of the first cooling chamber;

a tube extending axially through the outer portion of the die and through at least a portion of the shell, the tube having a maximum transverse dimension substantially smaller than the minimum internal dimension of the extrusion;

a seal cap mounted on the outer end of the tube and having an external shape matching the internal shape of the extrusion;

an annular recess in the die encompassing the inner end of the tube;

the external surface of the tube, the seal cap, the inner surface of the extrusion, and the annular recess in the die affording a second annular, sealed cooling chamber within the interior of a length of the extrusion emerging from the die;

a passageway connecting the interior of the tube, at its outer end, to the second cooling chamber;

at least one inlet port connected to the interior of the tube;

at least one outlet port connected to the recess in the die;

and means, connected to both inlet ports and both outlet ports, for filling both cooling chambers with a liquid coolant and for circulating a liquid coolant through each of the cooling chambers, from the outer end to the inner end, to cool both surfaces of the extrusion and solidify the extrusion as it emerges from the extruder.

7. The cooling apparatus of claim 6 wherein the passageway is formed in the seal cap.

8. The cooling apparatus of claim 6 further comprising thermal insulation lining at least a portion of the annular recess in the die.

9. The cooling apparatus of claim 6 further comprising thermal insulation at the die orifice.

10. The cooling apparatus of claim 6 wherein the exterior surface of the seal cap has a convex shape.

11. The cooling apparatus of claim 6 wherein the means for circulating a liquid coolant comprises means for maintaining a pressure in each of the cooling chambers which is below atmospheric pressure so that coolant does not leak out of the axial outlet opening of the shell seal ring.

12. The cooling apparatus of claim 6 in which the outlet duct for the second chamber is formed in the extrusion die.

13. The cooling apparatus of claim 6 wherein the cylindrical shell comprises two pieces joined along a plane generally parallel to the shell axis.

14. The cooling apparatus of claim 6 wherein the shell seal ring is split through the axial outlet opening into two portions such that upon start up of the apparatus the shell seal ring can be assembled about the elongated extrusion with the extrusion extending through the axial outlet opening.

15. The cooling apparatus of claim 6 wherein the axial outlet opening of the shell seal ring has a convex surface.

16. The cooling apparatus of claim 6 in which the inlet duct for the second chamber is formed in the extrusion die.

17. The cooling apparatus of claim 16 further comprising thermal insulation lining the inlet duct for the second chamber.

18. The cooling apparatus of claim 17 wherein the insulation comprises a vacuum tube.

* * * * *